(12) United States Patent
Vazquez et al.

(10) Patent No.: US 9,172,699 B1
(45) Date of Patent: Oct. 27, 2015

(54) ASSOCIATING A DEVICE WITH A USER ACCOUNT

(71) Applicant: MicroStrategy Incorporated, Vienna, VA (US)

(72) Inventors: Hector Vazquez, Ashburn, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 16 days.

(21) Appl. No.: 13/875,024

(22) Filed: May 1, 2013

Related U.S. Application Data

(60) Provisional application No. 61/731,887, filed on Nov. 30, 2012.

(51) Int. Cl.
| | |
|---|---|
| *H04L 29/06* | (2006.01) |
| *G06F 21/33* | (2013.01) |
| *G06F 21/32* | (2013.01) |

(52) U.S. Cl.
CPC ........ *H04L 63/0861* (2013.01); *H04L 63/0823* (2013.01); *G06F 21/32* (2013.01); *G06F 21/33* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 2003/0149666 | A1* | 8/2003 | Davies | 705/50 |
| 2011/0047605 | A1* | 2/2011 | Sontag et al. | 726/7 |
| 2011/0247055 | A1* | 10/2011 | Guo et al. | 726/4 |
| 2011/0265173 | A1* | 10/2011 | Naaman et al. | 726/8 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

(Continued)

*Primary Examiner* — David García Cervetti
*Assistant Examiner* — Amie C Lin
(74) *Attorney, Agent, or Firm* — Fish & Richardson P.C.

(57) ABSTRACT

In one implementation, a server receives a request from a client device to access a user account of a user, wherein the user account provides access to one or more credentials associated with the user. The server determines that the client device is not associated with the user account and transmits a message to the client device prompting the user to provide a biometric identification of the user. The server then receives data representing the biometric identification of the user from the client device. Next, the server determines that the data representing the biometric identification of the user matches a biometric profile of the user associated with the user account. Finally, in response to determining that the data representing the biometric identification of the user matches a biometric profile of the user associated with the user account, the server associates the client device with the user account, such that the user is enabled to access the user account, and the associated one or more credentials, from the client device.

20 Claims, 8 Drawing Sheets

(56) References Cited

OTHER PUBLICATIONS

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

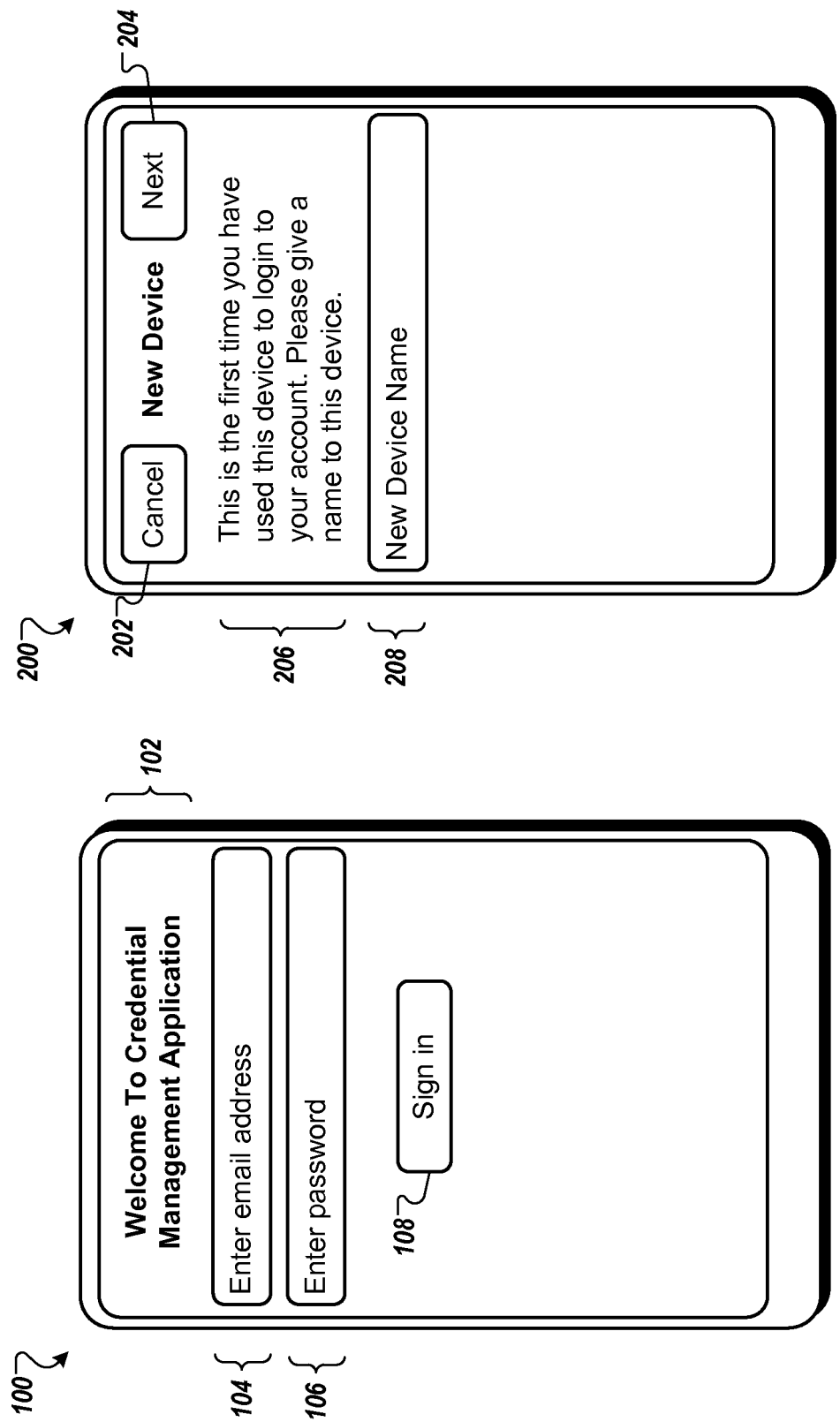

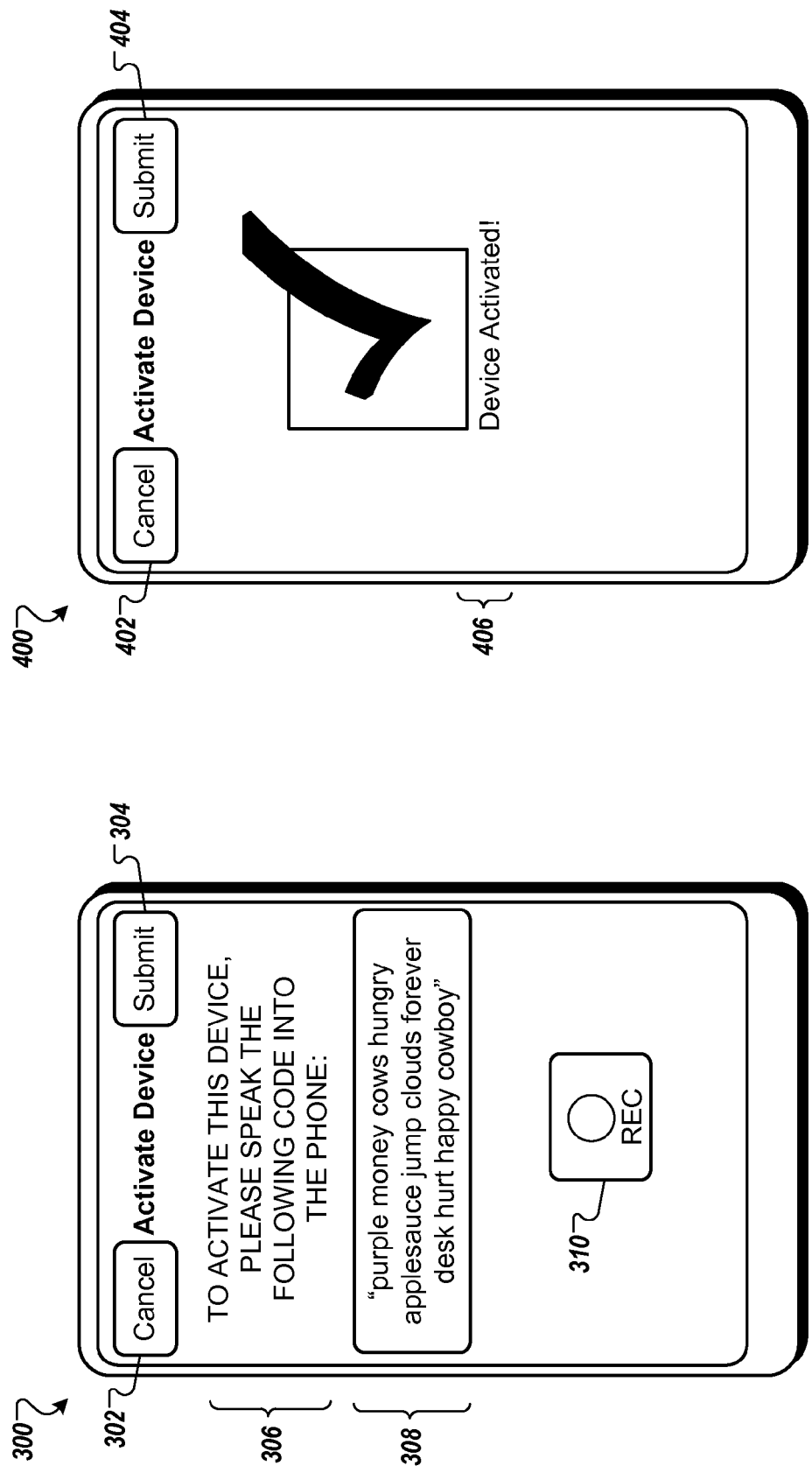

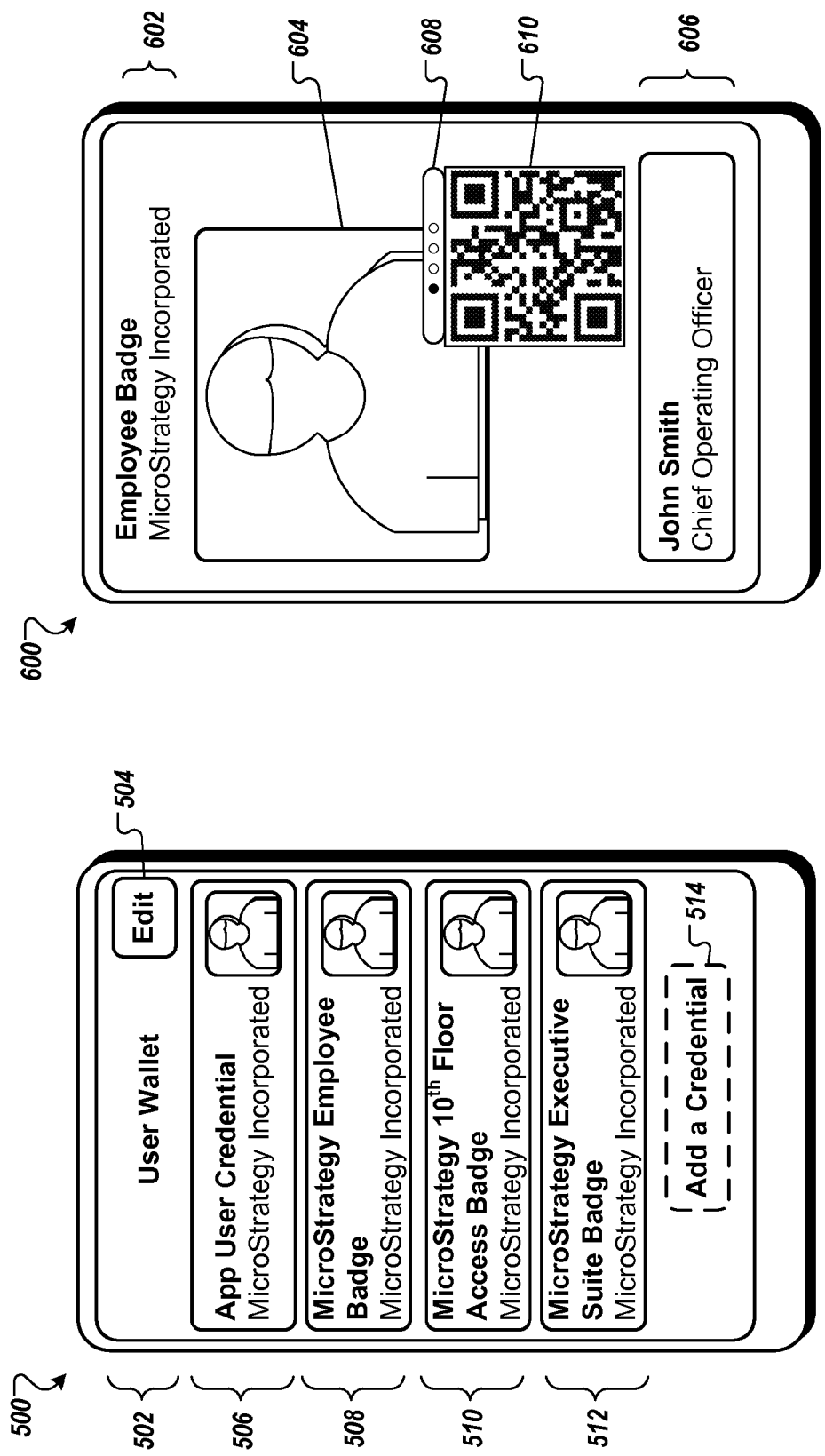

ASSOCIATING A DEVICE WITH A USER ACCOUNT

CROSS-REFERENCE TO RELATED APPLICATION

This application claims the benefit of U.S. Patent Application Ser. No. 61/731,887, filed on Nov. 30, 2012, which is incorporated herein by reference in its entirety.

TECHNICAL FIELD

This specification generally relates to associating a device with a user account.

BACKGROUND

A user account may be managed by a server system and accessed from one or more client devices.

SUMMARY

In general, one aspect of the subject matter described in this specification may include the actions of receiving a request from a client device to access a user account of a user, wherein the user account provides access to one or more credentials associated with the user. The actions further include determining that the client device is not associated with the user account and, in response to determining that the client device is not associated with the user account, transmitting a message to the client device prompting the user to provide a biometric identification of the user. Then, the actions include receiving data representing the biometric identification of the user and determining that the data representing the biometric identification of the user matches a biometric profile of the user associated with the user account. Finally, in response to determining that the data representing the biometric identification of the user matches a biometric profile of the user associated with the user account, the actions include associating the client device with the user account, such that the user is enabled to access the user account, and the associated one or more credentials, from the client device. The actions may also include in response to determining that the data representing the biometric identification of the user matches a biometric profile of the user associated with the user account, transmitting a certificate associated with the user account from the server to the client device.

In some implementations, the actions further include receiving, at the server, another request from the client device to access the user account of the user that includes the certificate. The actions then include determining that the client device is associated with the user account based on the certificate and then providing access to the user account of the user.

In some implementations, after transmitting a certificate associated with the user account from the server to the client device, the actions include receiving, at the server from the client device, a request to perform an action associated with the user account of the user, the request to perform an action including the certificate. The actions then include determining that the client device is associated with the user account based on the certificate. In response to determining that the client device is associated with the user account based on the certificate, the actions include authorizing the client device to perform the action and storing an indication that the action was performed by the client device, wherein the indication is associated with the user account.

In some implementations, a given user account may be associated with multiple different client devices. In some implementations, a given client device may be associated with multiple different user accounts.

In some implementations, determining that the client device is not associated with the user account comprises determining that the request does not include a certificate that is associated with the user account. In some implementations, the request may include a client device identifier of a client device, and determining that the client device is not associated with the user account may comprise determining, at the server, that the client device identifier is not associated with the user account.

In some implementations, the message may prompt the user to utter a phrase so as to provide a voice sample of the user. In such implementations, the actions include receiving the voice sample of the user from the client device and determining that the voice sample of the user matches a voice print of the user. Such implementations further include, in response to determining that the voice sample of the user matches the voice print of the user, associating the client device with the user account. The phrase may include one or more words randomly selected by the server from one or more dictionaries. Alternatively or in addition, the phrase may be selected by the user.

Some implementations involve transmitting the message to the client device for in-app display on the client device.

Some implementations involve transmitting the message via email to an email address associated with the user account. In such implementations, the actions may further include determining that the voice sample of the user comprises an utterance of the phrase from the email transmitted to the email address associated with the user account, and associating the client device with the user account in response to determining that the voice sample of the user matches the voice print of the user and in response to determining that the voice sample of the user comprises an utterance of the phrase from the email transmitted to the email address associated with the user account.

In some implementations, the message prompts the user to provide one or more of an iris scan, a fingerprint scan, or a facial scan. In such implementations, the actions include receiving from the client device one or more of the iris scan, the fingerprint scan, or the facial scan of the user and determining that the iris scan, the fingerprint scan, or the facial scan of the user matches an iris image, a fingerprint image, or a facial image of the user respectively. Finally, the actions include in response to determining that the iris scan, the fingerprint scan, or the facial scan of the user matches an iris image, a fingerprint image, or a facial image of the user respectively, associating the client device with the user account.

Some implementations involve transmitting, from the server to an email address associated with the user account, an alphanumeric code, receiving the alphanumeric code from the client device, and, in response to determining that the data representing the biometric identification of the user matches a biometric profile of the user associated with the user account and determining that the alphanumeric code received at the server matches the alphanumeric code transmitted from the server to the email address associated with the user, associating the client device with the user account.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to login to a credential management application on a client device.

FIG. 2 is an illustration of an example of a user interface of a credential management application for registering a new device.

FIG. 3 is an illustration of an example of a user interface for biometric verification in a credential management application.

FIG. 4 is an illustration of an example of a client device activation screen.

FIG. 5 is an illustration of an example of a user interface that enables a user to select from among various credentials associated with the user.

FIG. 6 is an illustration of an example representation of a credential.

DETAILED DESCRIPTION

Figures 7, 8:
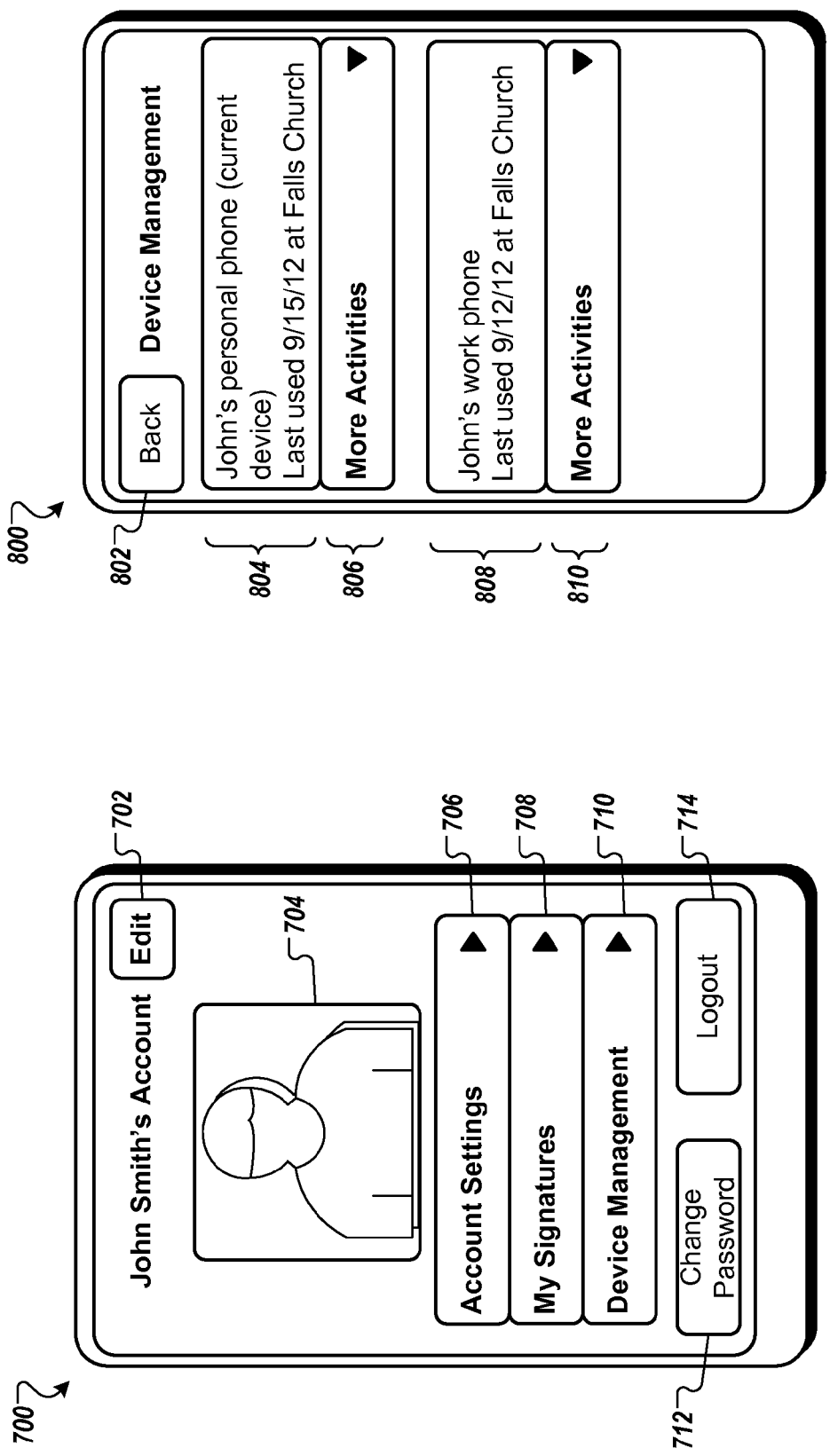
FIG. 7 is an illustration of an example of an account management screen in a credential management application.
FIG. 8 is an illustration of an example of an activity log in a credential management application.

In some instances, representations of credentials for groups of users or for individuals are generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from mobile credential management applications executing on client devices; and credentials can be represented in various forms as described below. For example, credentials can be represented by parametrically-generated graphical representations, animated graphical representations, phrases, numeric representations, and/or optical machine-readable representations (e.g., bar codes or QR codes). A server, or collection of servers, can manage and distribute credentials to appropriate users' client devices.

A mobile credential management application may enable users to access their credentials from multiple client devices. To prevent fraudulent use of a user's credentials from a client device, the mobile credential management application may require the user to authenticate their identity and register each of the user's client devices with a credential management server. The credential management server may issue a certificate to each of the user's client devices, such that the credential management server can recognize the client devices as having been registered with the user's account.

FIG. 1 shows an example of a user interface 100 that enables a user to login to a credential management application on a client device. In particular, when a user opens the credential management application on the client device, the client device presents login screen that includes a caption 102 stating "Welcome To Credential Management Application," an input box 102 for the user to enter an email address or username, and an input box 106 for the user to enter a password. After the user enters the user's email address (or username) and password, the user can select command button 108 to sign into their user account. In response, the client device transmits to a server a request for access to the user account, where the request includes the email address (or username) and password. The server then determines whether the email address (or username) and password are valid for a user account. If the email address (or username) and password are valid, the server determines whether the requesting client device has already been registered with the user account (e.g., by determining whether a valid certificate was included with the request). If not, then the application recognizes the device as a new device and displays the screen shown in FIG. 2.

FIG. 2 shows an example user interface 200 of a credential management application for registering a new client device. The user interface 200 shows a message 206 prompting the user that "This is the first time you have used this device to login to your account. Please give a name to this device." The user can provide a name for the new device in input box 208. The user interface 200 also includes a cancel button 202 to return to the previous screen and a next button 204 to proceed with the new device registration by providing biometric identification.

FIG. 3 shows an example user interface 300 for biometric verification in a credential management application. The user interface 300 includes a message 306 prompting the user that "To activate this device, please speak the following code into the phone." The client device provides a phrase 308 "purple money cows hungry applesauce jump clouds forever desk hurt happy cowboy" that the user may utter into a microphone of the client device. The client device may obtain the phrase, for example, by generating the phrase or receiving the phrase from the server. To start and stop recording the utterance of the phrase, the user presses the record button 310. The user interface 300 also includes a cancel button 302 to return to the previous screen (e.g., as shown in FIG. 2) and a submit button 304 to transmit the recorded utterance to the server.

FIG. 4 is an example of a client device activation screen 400. Assuming that the server authenticates the user (e.g., the submitted utterance matches a voice print associated with the user account), the server transmits a message to the client device indicating that the user was authenticated and the client device was registered with the user account. In some implementations, the message from the server includes a certificate that can be used by the client device for subsequently accessing the user's account. The application notifies the user that the client device has been successfully registered with the user account by providing a "Device Activated!" message 406. The screen 400 also includes a cancel button 402 to cancel the registration procedure, and a submit button 404 to continue to access the user's account (e.g., the user's wallet shown in FIG. 5).

FIG. 5 shows an example user interface 500 that enables a user to select from among various credentials associated with the user. In particular, the user interface 500 includes an example of a user's wallet (identified with a "User Wallet" caption 502) that provides the user with access to numerous different credentials associated with the user. The credentials in the user's wallet illustrated in FIG. 5 may have been made accessible via (e.g., downloaded to) the user's wallet responsive to successfully authenticating the user and associating the client device with the user's account. For example, the user interface 500 includes an "App User Credential" 506, a "MicroStrategy Employee Badge" 508, a "MicroStrategy 10$^{th}$ Floor Access Badge" 510, and a "MicroStrategy Executive Suite Badge" 512. The user can select any one of these credentials from the user's wallet to output a representation of the credential from the user's client device. The user may make the selection, for example, by touching the corresponding area on a presence-sensitive display (e.g., a touchscreen) of the client device. The user can also select an Edit command button 504 to modify settings associated with the credentials, and can add a credential to the wallet by selecting command button 514.

FIG. 6 shows an example representation of a credential. For example, when a user selects the "MicroStrategy Employee Badge" 508 shown in FIG. 5, the selected badge 600 may be displayed on the client device as shown in FIG. 6. The badge 600 includes a caption 602 identifying it as an "Employee Badge" for "MicroStrategy Incorporated." Also included is an image of the user 604 and a caption 606 that identifies the associated user as "John Smith, Chief Operating Officer." The badge 600 further includes a swiping slider 608 that may enable a user to select between different representations for the credential. For example, in the current position, the slider 608 causes an optical-machine readable representation for the credential 610 (e.g., a quick response (QR) code) to be displayed.

FIG. 7 shows an example of an account management screen 700 in a credential management application. In particular, the account management screen 700 is for John Smith's account and includes an image of the user 704. The screen 700 allows the user to edit the user's account by activating command button 702. The screen 700 also allows a user to view account settings by activating command button 706, view signatures associated with the user's account by activating command button 708, and perform device management functions by activating command button 710. The user can also change the user's password using command button 712 and logout of the user's account with command button 714. When the user activates the device management button 710, the application may navigate to a screen displaying an activity log.

FIG. 8 shows an example of an activity log 800 in a credential management application. The activity log 800 includes information for each client device associated with the user's account. For example, the activity log 800 shows an entry 804 for "John's personal phone," which is the current device from which the user is accessing the user's account. The entry 804 also indicates that the last time the phone was used was Sep. 15, 2012 and that it was used at Falls Church. For more details regarding the activities on "John's personal phone," the user may select command button 806. Additionally, the activity log 800 shows an entry 808 for "John's work phone." The entry 808 also indicates that the last time the phone was used was Sep. 12, 2012 and that it was used at Falls Church. For more details regarding the activities on "John's work phone," the user may select command button 810. The screen also includes a back button 802 that navigates the application to the previous screen (e.g., the account management screen 700).

Figure 9:
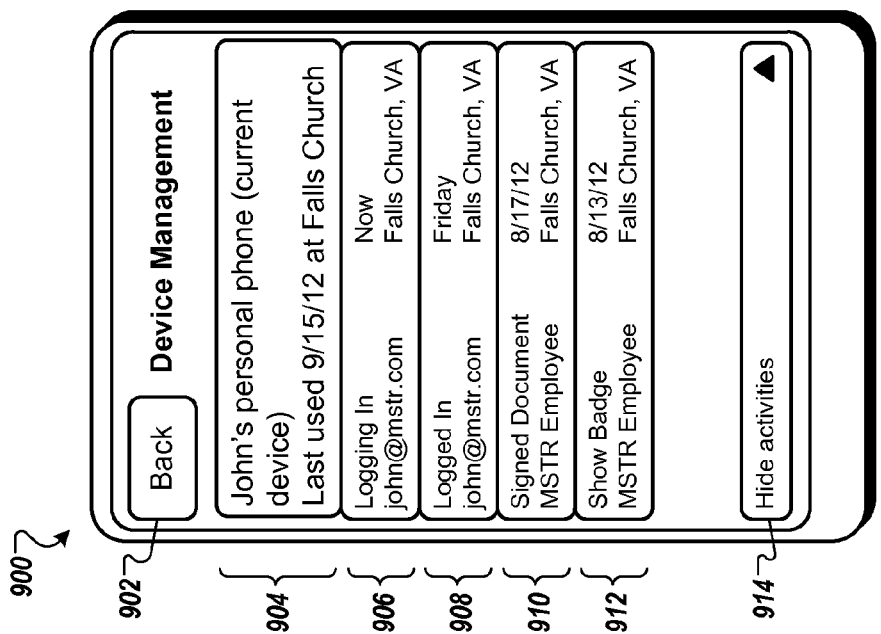
FIG. 9 is an illustration of an example of a detailed activity log in a credential management application.

FIG. 9 shows an example of a detailed activity log 900 in a credential management application. In particular, if the user selects command button 806 from FIG. 8 to view more details of activity on "John's personal phone," the detailed activity log 900 may be displayed. The log 900 shows a header 904 for "John's personal phone," which is the current device that the user is accessing. The header 904 also indicates that the last time the phone was used was Sep. 15, 2012 and that it was used at Falls Church. The log 900 includes additional entries with further details on usage of the client device entitled "John's personal phone." The entries include: an entry 906 indicating that the user is currently logged in to their account and the user is located in Falls Church, Va.; an entry 908 indicating that the user logged in to their account on Friday from Falls Church, Va.; an entry 910 indicating that the user signed a document with the user's MicroStrategy employee credential on Aug. 17, 2012 from Falls Church, Va.; and an entry 912 indicating that the user presented the user's MicroStrategy employee credential on Aug. 13, 2012 in Falls Church, Va. The log 900 also includes a hide activities command button 914 to return the user interface to the previous state (e.g., as shown in FIG. 8), and a back command button 902 to navigate the application to the previous screen (e.g., the account management screen 700 shown in FIG. 7). As described below, when the user performs different actions from a client device, information identifying the device (e.g., the certificate) is transmitted to the server that enables the server to track activity from the multiple different client devices of the user.

Figure 10:
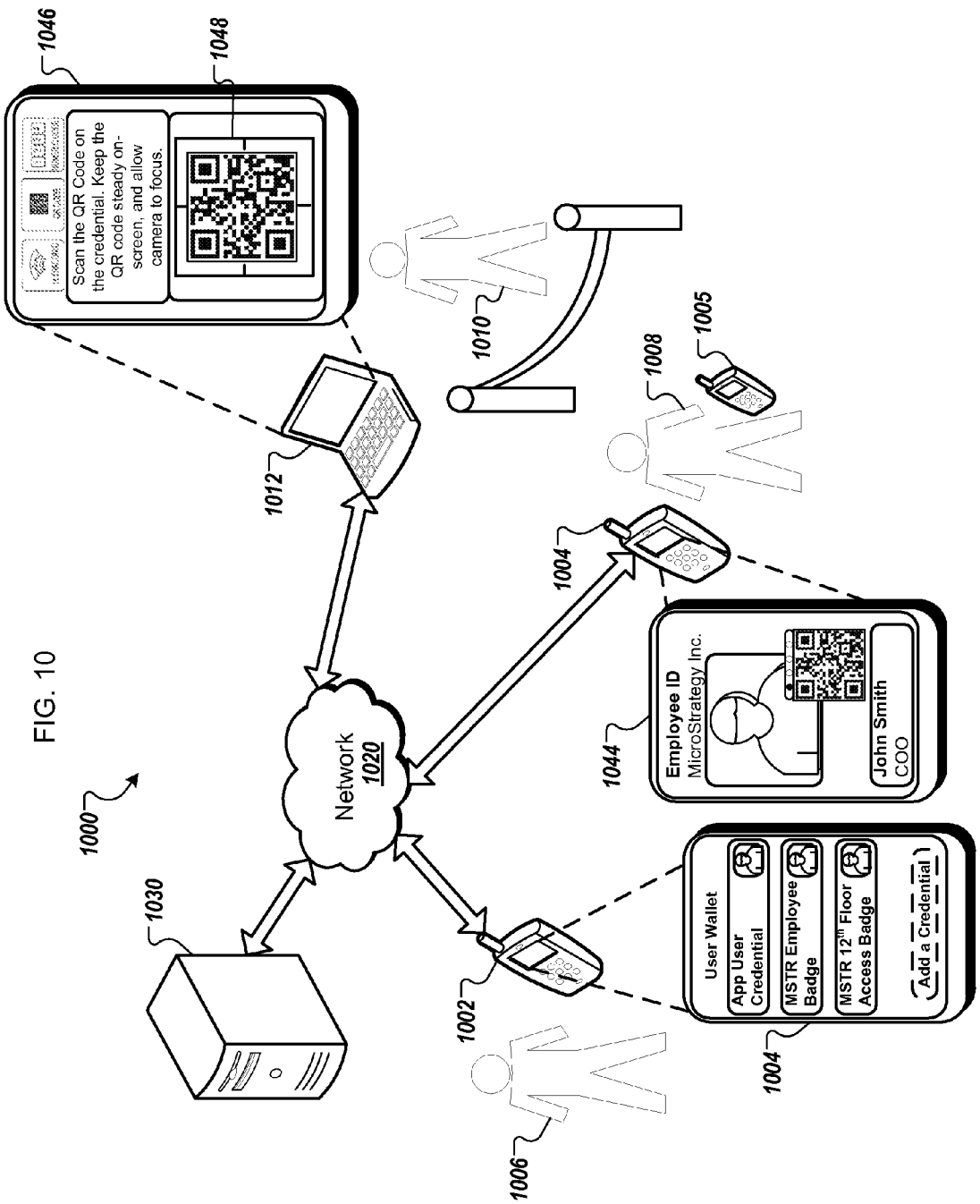
FIG. 10 is an illustration of an example system for management, distribution, and validation of user credentials.

FIG. 10 shows an example system 1000 for management, distribution, and validation of user credentials. As an overview, a credential management server 1030 communicates via a network 1020 with client device 1002 operated by user 1006, and client devices 1004, 1005 operated by user 1008. For example, the user 1008 may have a work client device 1004 and a personal client device 1005. The client devices 1002, 1004, and 1005 execute mobile credential management applications that allow them to manage, access, and output multiple credentials. The server 1030 also communicates via network 1020 with a processing system 1012 operated by a validation entity 1010. The validation entity 1010 operates the processing system 1012 to validate credentials presented by the users 1006, 1008 on their client devices 1002, 1004, 1005 by communicating with the server 1030 as described below.

In operation, the server 1030 manages and/or stores one or more credentials, associates users and groups of users with appropriate credentials, grants access to user accounts, and provides credentials to users' client devices and/or processing systems (e.g., operated by credential authorities). The server 1030 can be any suitable computer or collection of computers executing software capable of managing, distributing, and/or validating representations of credentials for users and groups of users via a network 1020 as described herein.

Credentials, user accounts, group accounts, and administrative accounts can be stored in a database (e.g., MySQL, PostgreSQL, MS SQL Server, MongoDB), or other suitable data structure that can be accessed by the server 1030. In some implementations, the server 1030 may access the stored credentials and/or user accounts via web services such as representational state transfer (REST) style services.

As an initial step, the server 1030 creates a credential based on input provided by a credential grantor (e.g., an employer). The credential may include a variety of information such as a credential identifier (e.g., a number or alphanumeric character string that uniquely identifies a credential), a description of an event or location, and one or more designated validation entities.

The server 1030 may present a suitable interface to the credential grantor for creation of credentials. For example, the server 1030 may present a web interface through which grantors can interact via a Web browser. In other aspects, the server 1030 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The server 1030 also may present an interface so that users and/or credential grantors can create user accounts for individual users and groups of users. For example, the server 1030 may present a web interface through which credential grantors can interact via a Web browser. Additionally or alternatively, the server 1030 may be directly accessible via a graphical-user interface or an application on a mobile device. User accounts may be stored in a table or collection of tables in a database, or in any other suitable data structure accessible by the server 1030. The user accounts may include a variety of information such as user name, user title, user identifier (e.g., a number or character string that uniquely identifies a user), one or more addresses (e.g., email addresses and/or mobile phone numbers), identifiers of one or more client devices owned by or otherwise associated with the user, and/or certificates associated with client devices. In some implementations as described below, user accounts may also be associated with a biometric profile of the user. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device 1002, 1004.

To create a new user account with the server 1030, the credential management application may require a new user 1006, 1008 to complete an initial account registration. As part of the initial account registration process, the new user 1006, 1008 may be required to provide biometric information (e.g., a voice sample, fingerprint, retina scan, and/or facial scan, etc.) to the mobile credential management application, which can be transmitted to the server 1030. Subsequently, the server 1030 can generate a biometric profile of the user 1006, 1008 based on the biometric information and associate the biometric profile with the user's account. For example, the user 1006, 1008 may be required to provide a voice sample by uttering a phrase into a microphone of the user's client device 1002, 1004. The client device 1002, 1004 may transmit this voice sample to the server 1030, which can extract features from the voice sample to generate a voice print that identifies the user. The mobile credential management application may automatically register the client device from which the new user completes the initial account registration process as an authorized device for the new user's account.

Upon completion of initial account registration, the server 1030 may transmit a certificate to the client device 1002, 1004 that was used for the registration, for example via the network 1020. The server 1030 also may associate the certificate with the user's account and the particular client device. For example, the server 1030 may store the certificate in a memory structure (e.g., a file system or database) and add an entry to the user's account identifying the certificate. A certificate may be, for example, a public key certificate and/or an authorization certificate. In some implementations, a certificate may be in a format specified in the X.509 ITU-T standard.

A public key certificate may be an electronic document that uses a digital signature to bind a public key with an identity. In particular, a public key certificate may include information such as a unique certificate identifier, a user name or user account number, a signature algorithm (RSA, Digital Signature Algorithm (DSA), or Elliptic Curve Digital Signature Algorithm (ECDSA)), a signature, an issuer name, and a public key. The public key certificate can be used to verify that a public key belongs to a user. In a typical public key infrastructure scheme, the signature will be of a certificate authority. In a web of trust scheme, the signature is of either the user (a self-signed certificate) or other users. In either case, the signatures on a certificate are attestations by the certificate signer that the identity information and the public key belong together.

An authorization certificate may be an electronic document that includes authorization information associated with a holder of the certificate. For example, the authorization certificate may indicate that the holder of the certificate is authorized to access a resource, service, or location. In particular, an authorization certificate may include information such as an issuer name, a signature algorithm, a signature, a unique certificate identifier, and identifiers of the resources, services, or locations that the certificate authorizes access to.

An individual may be able to access the individual's user account and credentials from multiple different client devices. When a user 1006, 1008 attempts to login to the application from a client device 1002, 1004 that the user has not previously registered with the credential management server 1030, the credential management application may recognize the client device as a new device. For example, the application may determine that the new device lacks a certificate from the server 1030 by querying a memory location where the certificate would be stored. As a result of determining that the device is a new device, before allowing the user to access the user's account, the credential management application may require the user to authenticate himself/herself at the new device.

In particular, the mobile credential management application may require the user to provide biometric identification (e.g., an utterance, fingerprint, retina scan, and/or face scan, etc.). For example, the credential management application may prompt the user 1006, 1008 to utter a phrase. As referred to herein, a phrase may be a sequence of two or more words selected from one or more dictionaries of words that need not form a grammatical construct. A dictionary as used herein is a data structure in which index values identify words. A given dictionary may include many thousands of different words. In some implementations, the application on the client device 1002, 1004 may select a phrase based on an index that can be randomly generated or generated based on a current time. In some implementations, the user may utter a phrase of their choosing. Alternatively or in addition, the server 1030 may select a phrase and transmit the phrase to the application on the client device 1002, 1004, where the phrase can be displayed to the user. Moreover, in some implementations, rather than transmitting the phrase directly to the mobile application on the client device 1002, 1004, the server 1030 may transmit the phrase to an email address or mobile phone number (via SMS for example) associated with the user account. Advantageously, transmitting the phrase in this manner may provide an additional level of authentication because the user will have to access the email account or SMS inbox to obtain the phrase.

When the user utters the phrase into a microphone of the client device 1002, 1004, the application may encode the utterance and transmit data representing the utterance to the server 1030. The server 1030 can then perform speaker recognition on the phrase uttered by the user 1006, 1008 to authenticate the user. For example, the server 1030 can retrieve a voice print associated with the user's account from a memory structure (e.g., a file system or database), and then compare the characteristics of the utterance with the user's voice print. Alternatively or in addition, the client device 1002, 1004 may obtain a voice print of the user (e.g., receive the voice print from the server 1030 or from a third-party server that stores user voice prints), and then perform speaker recognition using the obtained voice print.

Alternatively or in addition, the user may provide an iris image, a fingerprint image, and/or a facial image for authentication. For example, the user may take an image of the user's eye or face using a camera attached to the client device 1002, 1004. The image may then be transmitted to the server 1030 for verification or verified on the client device 1002, 1004. In some implementations, the client device 1002, 1004 may have a fingerprint scanner operatively coupled to the device, in which case the user 1006, 1008 may provide a scan of one or more fingerprints. The fingerprints can then be transmitted to the server 1030 for verification or verified on the client device 1002, 1004.

In some implementations, the mobile credential management application may employ multi-factor authentication to authenticate a user at a new device. For example, the user may have to provide two or more inputs to authenticate a new device. These inputs may include any suitable combination of: an utterance, an alphanumeric code sent to an email address associated with the user account, an iris scan, a fingerprint scan, and/or a facial scan. For example, the server 1030 may transmit an alphanumeric code to an email address or mobile phone number (via SMS for example) associated with the user account, and require both the alphanumeric code and an utterance that matches the voice print associated with the user account to register a new device.

Multiple different users may be able to register the same client device for use with multiple different user accounts, respectively, for example if several users share the same client device. In particular, each user may login to their user account from the same client device and authenticate himself/herself and receive a certificate associated with their user account as described above. The client device may then store the certificates for the different users in memory. When a user attempts to access the user's user account from the client device, the application can then retrieve the relevant certificate for the user.

Some implementations may include a master client device associated with a user account that has additional privileges. For example, the master client device may have the capability to confirm that a client device may be registered with a user account and/or may be able to deactivate registered client devices. In particular, when a user attempts to login to the user's user account from a new device, in addition to the biometric verification discussed above, the server 1030 may notify the master client device and require confirmation from the master client device prior to registering the new device. The master client device also may deactivate a client device registered with a user account, for example, by transmitting a deactivation message to the server 1030, which then removes the client device from a list of client devices that are permitted to access the user account. The master client device may be the original client device used to setup the user account by default, or may be another device chosen by the user. In some implementations, the server 1030 may require additional levels of authentication to setup or change a master client device. For example, if the server 1030 requires only an utterance to register a normal client device, the server 1030 may require both an utterance and an alphanumeric code transmitted to an email address associated with the user account to establish (e.g., register or change) a master client device.

Upon successful authentication, the server 1030 registers the new device 1002, 1004 as an authorized device for the user's account and transmits a certificate to the new device as described above. The certificate subsequently enables the application to recognize the device as having been registered with the user's account.

In some implementations, a user can have the certificate deleted from a client device. This may provide additional security by causing a user to perform another authentication to access their user account from the device. For example, the client device may automatically delete a certificate from a client device when a user logs out of the user's account from the device. Alternatively or in addition, the user may cause a certificate to be deleted from a client device as part of deactivating the client device from a master client device as described above. In addition, a user may choose to delete a certificate from a client device as an option when the user is logged into their user account from the device.

As an example, Mr. John Smith (user 1008) may request to setup a new user account on the server 1030 using an application executing on his work client device 1004. The client device 1004 prompts Mr. Smith to provide biometric information (e.g., an utterance, a fingerprint, facial scan, and/or iris scan), which is transmitted to the server 1030. The server 1030 can then create database entries representing a user account for Mr. Smith, where the user account includes a biometric profile incorporating the provided biometric information. A credential grantor could then create a row in another table for a group identified as employees of Company X. The grantor and/or server 1030 could then link the database entry for Mr. Smith to the group account for Company X through use of a linking table. Finally, the server 1030 may transmit a certificate to the client device 1004 that allows Mr. Smith to access his new user account from device 1004 without providing biometric identification.

Subsequently, Mr. Smith attempts to access his user account using a credential management application on his personal client device 1005. The client device 1005 (or the server 1030) recognizes that the client device 1005 is not registered with his user account (e.g., by determining that the client device 1005 lacks a certificate associated with the user account). Accordingly, the application on client device 1005 prompts Mr. Smith to provide biometric information to verify his identity. The client device 1005 then transmits this biometric information to the server 1030, which compares the biometric information with the biometric profile associated with Mr. Smith's account to verify Mr. Smith's identity. Finally, the server 1030 transmits a certificate to Mr. Smith's personal client device 1005, thus enabling Mr. Smith to access his user account from device 1005.

Once credentials and user accounts have been created, credential grantors and/or users can associate the credentials with user accounts, or groups of users. For example, the server 1030 may present a web interface through which grantors can interact via a Web browser to link a given credential to a given user or group of users. In other aspects, the server 1030 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1030 also may notify the users that they have been associated with the credential(s), for example by pushing notifications to the respective users' client devices. Such notifications may include the credential identifier.

Once credentials have been associated with appropriate user and/or group accounts, the credentials can then be distributed to client devices for the appropriate users via the network 1020. For example, the network 1020 may be a local area network ("LAN") and a wide area network ("WAN"), e.g., the Internet. In some versions, the server 1030 may communicate with the client devices via SMS or multimedia messaging service (MMS). The server 1030 may access user accounts in a database to locate the appropriate users' client devices.

Credential management applications executing on client devices 1002, 1004, and 1005 can receive the credentials associated with their respective users 1006, 1008 and store them in any suitable memory for later retrieval. A given user 1006, 1008 may be associated with multiple different credentials. Some or all of the credentials associated with a user 1006, 1008 may be accessible on a user's client device 1002, 1004, and 1005. In particular, mobile credential management applications executing on the client devices 1002, 1004, 1005 can then retrieve the credentials so they can be used for generating and presenting a representation of the credential to a validation entity for validation. The client devices 1002, 1004, 1005 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

In some implementations, each time a user 1006, 1008 attempts to access a user account (e.g., to present credentials or manage a user account) from a client device 1002, 1004, the client device 1002, 1004 may transmit a request for authorization to the server 1030. If the client device 1002, 1004 has previously been associated with the user account, the client device 1002, 1004 may have a certificate stored in memory, which can be included with the request to the server 1030. The server 1030 then can verify that the client device 1002, 1004 was associated with the user account by confirming the validity of the certificate. For example, the server 1030 may confirm that information in the certificate (e.g., a certificate serial number and/or signature) matches information from a certificate previously issued by the server 1030 that is associated with the user's account. If the server 1030 verifies that the client device 1002, 1004 is associated with the requested user account, the server 1030 may grant access to the account, for example by transmitting a message to the client device 1002, 1004 including the requested information.

In some implementations, the server 1030 may monitor usage of each registered client device. For example, each time a user logs into the user's user account from a registered client device, the server 1030 may store an entry in a memory structure (e.g., a database or a flat file) storing details of what device was used, and where and when the user logged in (e.g., a device identifier, a user name, user account identifier, email address, location, date and/or time). In particular, when a client device 1002, 1004 submits a login request, the request may include a current location of the client device, for example, based on GPS coordinates, Wi-Fi access point triangulation data, cellular network triangulation data, or IP address information. The server 1030 may also store entries when a client device outputs a representation of a credential for validation (e.g., displays a badge), or signs a document using a credential. For example, when the credential management application on a client device 1002, 1004 outputs a representation for a credential or signs a document using a credential, the client device may transmit information to the server 1030 describing the use (e.g., a device identifier, a user name, user account identifier, the type of use, email address, location, date and/or time). Alternatively or in addition, when a credential is presented for validation, a processing system 1012 operated by the validation entity may transmit the usage information to the server 1030. The server 1030 may then store an entry including these details.

Additionally, the server 1030 may provide access to the account usage information. For example, when a user logged into a registered client device 1002, 1004 requests account usage information (e.g., by activating command button 710 in FIG. 7 to display device management information), the client device may request account usage information from the server 1030. The server 1030 retrieves the account usage information associated with the account (e.g., by querying a database or accessing a flat file) and then transmits the requested information back to the client device 1002, 1004. The client device 1002, 1004 can then display the account usage information on a user interface, for example as shown in FIG. 9.

FIG. 10 illustrates an example in which the credentials correspond to employee badges for gaining entry into a place of business. Users 1006, 1008 are employees and, consequently, have received credentials related to the business. In addition, the client devices 1002, 1004 have already been registered with the user accounts of their respective users. Accordingly, the client devices 1002, 1004 have certificates stored in memory that allow credential management applications on the client devices 1002, 1004 to access credentials and account management features of the respective user accounts.

For example, the client device 1002 of user 1006 is executing an application that displays a user interface 642 (similar to the user interface 500 shown in FIG. 5) including a user wallet that allows the user 1006 to select from among various credentials. The client device 1004 of user 1008 is executing an application that displays a user interface 1044 such as the employee badge shown in FIG. 6. The user interface 1044 includes a quick response (QR) code. User 1008, at the front of the entry line, has presented the QR code for validation to the validation entity 1010. The validation entity 1010 is a security guard responsible for permitting only authorized individuals to enter the place of business. The credential for accessing the place of business may be represented in a variety of different formats described below, and the validation entity 1010 may be able to validate representations of the credential in any of these different formats.

In some implementations, the client device 1002, 1004 may obtain the user's image from, for example, a memory of the client device 1002, 1004, or a server such as the server 1030. The client device 1002, 1004 may display this image before, after, and/or during presentation of the optical machine-readable representation for authentication of the user 1006, 1008.

After a user 1006, 1008 logs into a user account from the user's client device 1002, 1004 (e.g., by transmitting a request for access to the server 1030 that includes a certificate), the user 1006, 1008 may operate their client device 1002, 1004 to present representations of credentials for validation. For example, the user 1006, 1008 may input a command into the user's client device 1002, 1004 via a man-machine interface (e.g., a user interface on a presence-sensitive display) to select a desired credential. The credential management application executing on the client device 1002, 1004 then generates and outputs the selected representation to a validation entity 1010 for validation.

The representation of a credential may take a variety of different forms. For example, the representation may be an alphanumeric code, a sound signal (e.g., an audible sound signal or an ultrasonic sound signal), an optical machine-readable representation (e.g., a barcode or a quick response (QR) code), a parametrically-generated graphical representation, an animated graphic representation, and/or a phrase, among others.

As referred to herein, an alphanumeric code may be a sequence of numbers and/or letters (e.g., 4 to 24 characters) that is associated with a credential and a user. In some instances, a given alphanumeric representation will only be valid for a certain time period. In operation, applications for credential validation execute on the client device 1002, 1004 and the processing system 1012. The server 1030 associates an alphanumeric code with a user 1006, 1008 and a credential, and distributes the alphanumeric code to the user's client device 1002, 1004. When the user 1006 presents the alphanumeric code to the validation entity 1010, the processing system 1012 can validate the alphanumeric code by communicating with the server 1030, and receiving a response indicating whether the presented alphanumeric code matches a valid alphanumeric code (e.g., an alphanumeric code that currently is associated with a user to whom a valid credential has been granted at the point in time the processing system 1012 communicates the alphanumeric code to the server 1030).

As referred to herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers and any other suitable data. In other implementations, the optical machine-readable representations may encode other identifiers that are linked to or otherwise associated with credential identifiers. As an example, credential identifiers for the users 1006, 1008 may be encoded using QR codes.

The client device 1002, 1004 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

When the client device 1002, 1004 displays an optical machine-readable representation, the validation entity 1010 can operate the processing system 1012 to scan the portion of the client device's display showing the representation and decode the representation to generate a set of alphanumeric characters that were encoded in the representation. In particular, the processing system 1012 may provide a user interface 1046 that includes a reticle 1048 defining a field of view from a camera operatively coupled to the processing system 1012. This reticle can be used by the validation entity 1010 to scan the optical machine-readable representation from the relevant portion of the client device's display 1044.

The processing system 1012 may use any suitable mechanism to scan and decode the optical machine-readable representation. For example, the processing system 1012 may access a function or library routine that captures and decodes QR codes and/or barcodes using a camera operatively coupled to the processing system 1012. Suitable libraries may include, for example, RedLaser or Zxing.

The processing system 1012 can then validate the optical machine-readable representation by communicating data corresponding to the alphanumeric characters that were encoded in the representation to the server 1030. In response, the processing system 1012 receives a response indicating whether the presented optical machine-readable representation corresponds to a credential that currently is associated with a user to whom a valid credential has been granted at the point in time the processing system 1012 communicates the alphanumeric code to the server 1030.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The sound signal may encode data including or representing credential identifiers and any other suitable data. In other implementations, the sound signal may encode other identifiers that are linked to or otherwise associated with credential identifiers. As an example, credential identifiers for the users 1006, 1008 may be encoded using sound signals. The client device may use any suitable technique for encoding the sound signal. For example, the client device may call a function or library routine that encodes data into sound signals such as the Zoosh SDK by Naratte, Inc. The client device 1002, 1004 can then output the sound signal from a speaker coupled to the client device for reception by the processing system 1012.

When the client device 1002, 1004 outputs a sound signal, the validation entity 1010 can operate the processing system 1012 to receive the sound signal at a speaker of the processing system and decode the sound signal to generate a set of alphanumeric characters that were encoded in the sound signal. The processing system 1012 may use any suitable mechanism to receive and decode the sound signal. The processing system 1012 can then validate the alphanumeric characters by communicating with the server 1030. In response, the processing system 1012 receives a response indicating whether the alphanumeric characters encoded in the sound signal correspond to a credential that is currently is associated with a user to whom a valid credential has been granted at the point in time the processing system 1012 communicates the alphanumeric characters to the server 1030.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 1002, 1004 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 1012 obtains a credential identifier and a time, and generates a parametrically generated graphical representation for the credential in the same manner. When the timing device at the processing system 1012 is synchronized with the timing devices at client device 1002, 1004, the parameters generated at the processing system 1012 should be identical (or nearly identical) to those of the client device 1002, 1004 when the credential identifiers are the same. The graphical representation generated by processing system 1012 should therefore match the graphical representations on the client device 1002, 1004 allowing the validation entity 1010 to visually validate the credential on the client device 1002, 1004.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 1002, 1004 may access the stored graphical representations by way of index values, where an index value may correspond to a single representation. In operation, a client device 1002, 1004 obtains a credential identifier (e.g., from a memory of the client device) and a time (e.g., from a timing device of the client device), and selects an animated graphical representation for the credential by using the credential identifier and the time to generate an index value. Similarly, for validation, the processing system 1012 obtains a credential identifier and a time, and selects an animated graphical representation for the credential in the same manner. When the timing device at the processing system 1012 is synchronized with the timing device at client device 1002, 1004 the index values generated at the processing system 1012 should be substantially identical to those of the client device 1002, 1004 when the credential identifiers are the same. The graphical representation selected by processing system 1012 should therefore match (or nearly match) the graphical representations on the client devices 1002, 1004 allowing the validation entity 1010 to visually validate the credential on the client device 1002, 1004.

A phrase may be a sequence of two or more words selected from one or more dictionaries of words that need not form a grammatical construct. In operation, applications for credential validation executing on the client device 1002, 1004 and the processing system 1012 can access a common set of dictionaries for generating phrases, so that when the applications reference the same index values in the same dictionaries, at substantially the same time, they can select the same phrases. Thus, the processing system 1012 displays the same phrase as the client devices 1002, 1004 which enables the validation entity 1010 to validate the phrases at the client device 1002, 1004.

When the server 1030 receives a validation request message from the processing system 1012, it attempts to confirm that the presented representation of the credential is valid. In particular, the server 1030 may decode a set of alphanumeric characters and/or parse an alphanumeric code to obtain the credential identifier. The server 1030 can then access the corresponding credential using the credential identifier (e.g., from a database by querying using the credential identifier). Upon retrieving the credential, the server 1030 can determine whether the presented representation for the credential was valid by comparing data received in the validation request message with data associated with the retrieved credential. For example, the server 1030 may determine that a user identifier included in the validation request corresponds to an authorized user of the credential. In some implementations, the processing system 1012 may perform some or all of the validation of the representations for the credential.

In some implementations, if the credential representation is validated, the validation response may include an image, a name, and/or other data relating to the validated user including, e.g., a copy of the user's credential. The server 1030 may obtain information relating to the user (e.g., an image of the user) from the credential grantor as described above. For example, the processing system 1012 may display the user's name and the user's image. In some implementations, responsive to receiving a validation response from the server 1030, the processing system 1012 may obtain the user's image from, for example, a memory of the processing system 1012, the server 1030, a server made accessible by the credential grantor, or another server. The processing system 1012 may then output the user's image to a display operatively coupled to the processing system 1012.

Upon successful validation, the server 1030 sends the processing system 1012 a validation response indicating that the representation for the credential was valid (e.g., the set of alphanumeric characters decoded from the representation matches a set of alphanumeric characters generated at the server 1030). The processing system 1012 may then provide an indication to the validation entity 1010 that the representation presented by the user 1008 was valid. The validation entity 1010 may then permit the user 1008 to enter the place of business.

While shown in FIG. 10 as a person, the validation entity 1010 can be any agent capable of validating representations of credentials presented by users. As an example, the validation entity 1010 could be a software application executing on the processing system 1012 that processes a representation for a credential received from a client device 1002, 1004, decodes the representation to generate an alphanumeric set of characters, transmits the alphanumeric set of characters to the server 1030, and receives a response from the server 1030 indicating that the representation is valid. The software application could then control an automated gate to permit user 1008 to enter. The processing system 1012 can also be any suitable computer or set of computers capable of communicating with the server 1030 via network 1020, such as a mobile phone, smart phone, PDA, tablet computer, laptop or desktop computer, or other stationary or portable device, that includes one or more processors and non-transitory computer readable media.

Representations for multiple credentials may be displayed and/or presented concurrently. This may be implemented, for example, when credentials represent a hierarchy of access. As an example, if Mr. John Smith is an employee of MicroStrategy Incorporated and also is authorized to access the Executive Suite of MicroStrategy's headquarters, he may have two credentials, i.e., a first credential identifying Mr. Smith as an employee who is authorized to enter the headquarters, and a second authorizing Mr. Smith to access the Executive Suite. In such implementations, representations for the first credential and the second credential may both be presented at the same time or in series so that a validation entity can permit Mr. Smith access to the Executive Suite.

Figure 11:
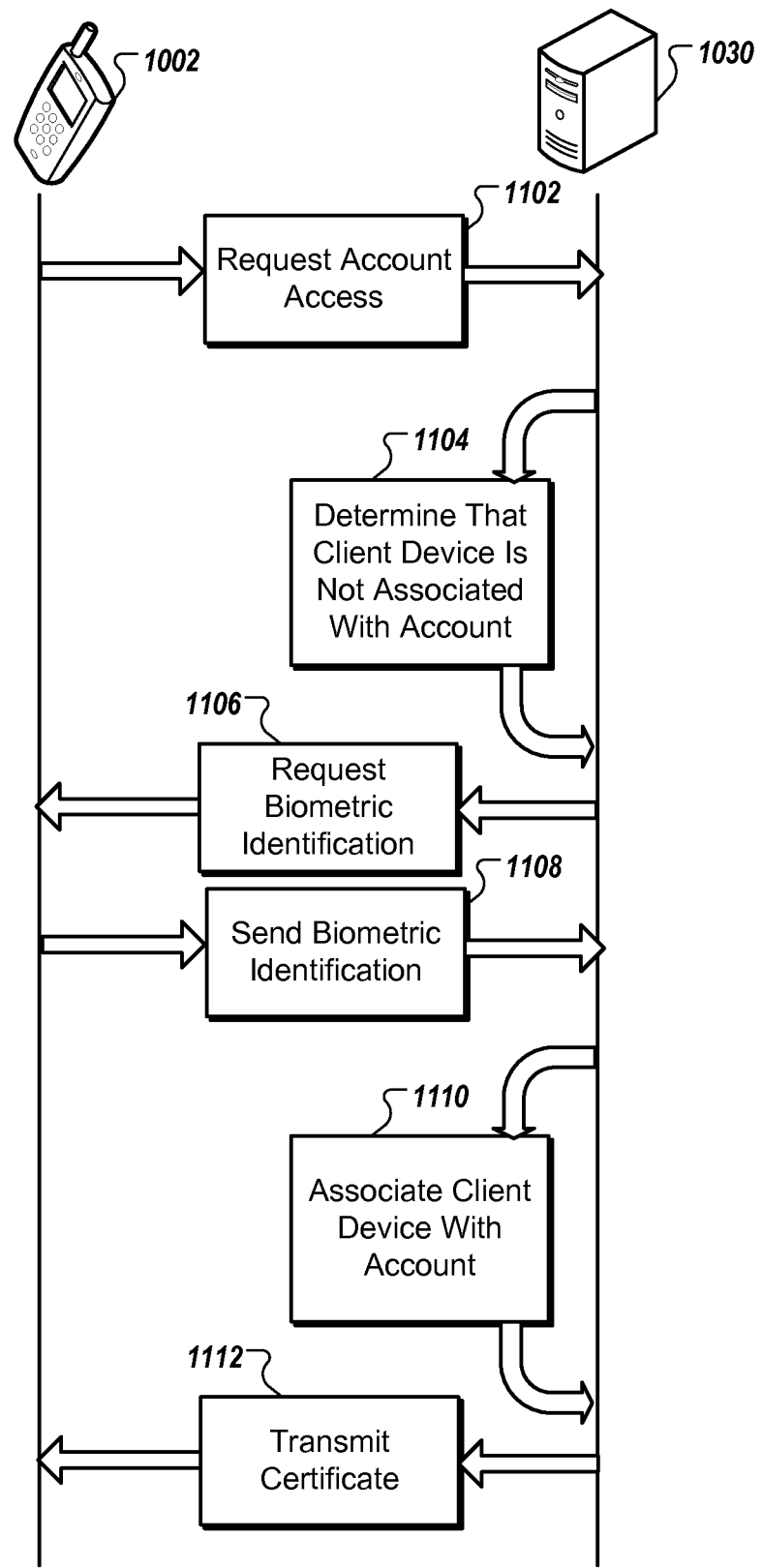
FIG. 11 is a messaging diagram that illustrates examples of messages between a client device and a server in a system for management, distribution, and validation of user credentials.

FIG. 11 shows sample messages between a client device 1002 and a server 1030 in a system for management, distribution, and validation of user credentials. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, a user 1006 operates a client device 1002 to attempt to access a user account of a credential management application. The client device 1002 transmits a message 1102 to the server 1030 requesting account access (e.g., by providing an email address or username and a password). In response, in step 1104, the server 1030 determines that the requesting client device 1002 is not currently associated with the specified user account. The server 1030 then transmits a message 1106 to the client device 1002 notifying the user 1006 that the client device is not currently associated with the account, and prompting the user to provide biometric identification (e.g., an utterance, facial scan, iris scan, and/or fingerprint) to authenticate the user. As discussed above, the user 1006 provides the requested biometric identification and the client device 1002 transmits this information to the server 1030 in message 1108.

Upon confirming that the provided biometric identification matches a biometric profile associated with the user account, the server 1030 associates the client device 1002 with the user account in step 1110. For example, the server 1030 may compare characteristics of an utterance from the user 1006 with a voice print to confirm the identity of the user. Once the client device 1002 is registered with the user account, the server 1030 transmits a certificate to the client device 1002 in message 1112. Subsequently, the client device 1002 can access the user account using the certificate without having to provide biometric identification. The process described in relation to the messages in FIG. 11 could be repeated for multiple different users of the client device 1002 to register the device 1002 with their accounts. In addition, this process could be repeated at multiple different client devices for the same user to register the different client devices with his/her user account.

Figure 12:
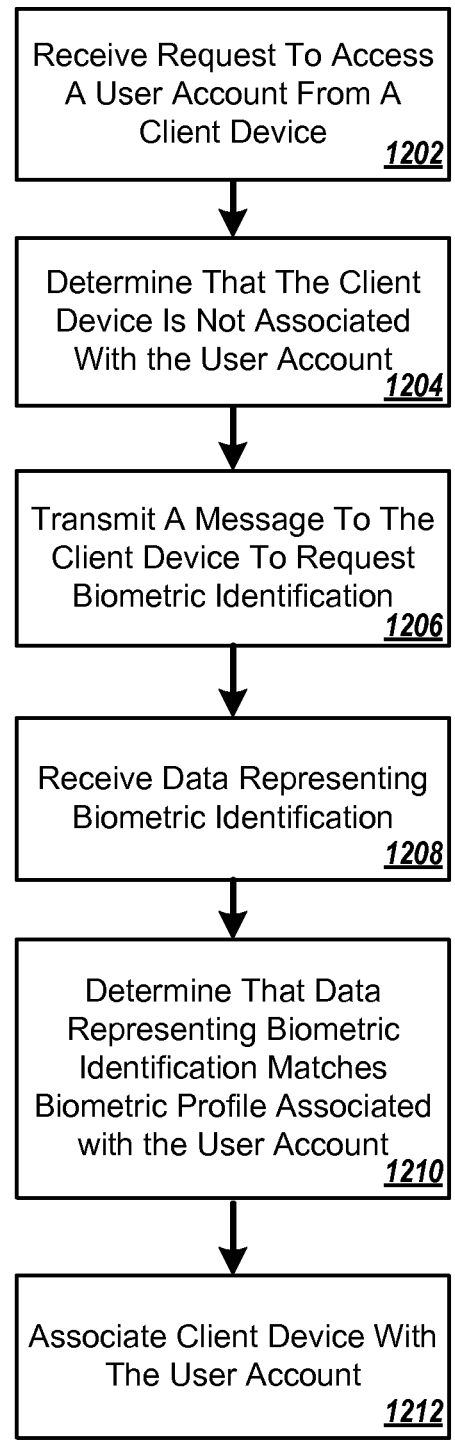
FIG. 12 is a flowchart of an example process for granting access to a user account.

FIG. 12 shows an example process for granting access to a user account. In step 1202, a server 1030 receives a request from a client device 1002 to access a user account of a user (e.g. by providing an e-mail address or username and a password). The user account provides access to one or more credentials associated with the user.

In step 1204, the server 1030 determines that the client device 1002 is not associated with the user account. For example, the server 1030 may determine that the request from the client device does not include a certificate associated with the user account. Alternatively or in addition, the request may include a client device identifier of the client device 1002, and the server 1030 may determine that the client device identifier is not associated with the user account.

In response to determining that the client device is not associated with the user account, in step 1206, the server 1030 transmits a message to the client device 1002. The message prompts the user to provide biometric identification. For example, the message may prompt the user to utter a phrase so as to provide a voice sample. The phrase may be one or more words randomly selected by the server or the client device from one or more dictionaries, or may be chosen by the user. The message may be transmitted for in-app display on the client device, or may be transmitted via email to an email address associated with the user account. Alternatively or in addition, the message may prompt the user to provide a fingerprint, provide an iris scan, and/or provide a facial scan.

In step 1208, the server 1030 receives data representing biometric identification of the user from the client device 1002. For example, the server 1030 may receive data encoding a voice sample corresponding to an utterance of a phrase, a fingerprint, an iris scan, and/or a facial scan. The server 1030 then determines that the data representing the biometric identification of the user matches a biometric profile of the user associated with the user account in step 1210. For example, the server 1030 may determine that the voice sample of the user matches a voice print of the user. In implementations where the phrase was transmitted to an email address associated with the user account (or some other destination accessible by the user associated with the user account), the server 1030 may also perform speech recognition to determine whether the voice sample of the user corresponds to an utterance of the phrase from the email transmitted to the email address associated with the user account. Alternatively or in addition, the server 1030 may determine that a fingerprint from the client device matches a fingerprint associated with the user account, that an iris scan from the client device matches an iris image associated with the user account, and/or that a facial scan from the client device matches a facial image associated with a user account.

Finally, in response to determining that the data representing the biometric identification of the user matches a biometric profile of the user associated with the user account, the server 1030 associates the client device 1002 with the user account in step 1212. As a result, the user is enabled to access the user account, and the associated one or more credentials, from the client device 1002. In some implementations, after determining that the data representing the biometric identification of the user matches a biometric profile of the user associated with the user account, the server 1030 transmits a certificate associated with the user account to the client device 1002.

After the client device 1002 has been associated with the user account, the client device 1002 may send a second request to access the user account, where the second request includes a certificate associated with the user account. The server 1030 receives this second request from the client device 1002 and determines that the client device is associated with the user based on the certificate (e.g., by comparing information in the transmitted certificate with information accessed by the server 1030 for a corresponding certificate associated with the user account). The server 1030 then provides the client device 1002 with access to the user account.

After the client device 1002 has been associated with the user account, the client device 1002 may transmit a request to the server 1030 to perform an action associated with the user account, where the request may include a certificate. For example, the client device 1002 may request to access credentials associated with the user account or view usage information of the user account. The server 1030 then determines that the client device 1002 is associated with the user account based on the certificate. Accordingly, the server 1030 authorizes the client device 1002 to perform the requested action and stores an indication (e.g., a database entry or flat file entry) that the action was performed by the client device. The server 1030 also associates the indication with the relevant user account so that it can be retrieved later.

In some implementations, multiple different client devices may be associated with a user account, such that a user can access the user's user account from several devices. For example, if a first client device 1004 is not currently associated with a user account, then the user may authenticate the user's identity as described above and receive a certificate on the first client device 1004. Subsequently, the user can login to their user account and perform actions (e.g., presenting representations for credentials) from the first client device. The server 1030 can then monitor use of the first client device to access the user account. The user may then authenticate the user's identity and receive a certificate on a second client device, which can then be used to login to their user account and perform actions as described above.

In some implementations, multiple different users may access their user accounts from the same client device. For example, if a client device 1004 is not currently associated with a user account of a first user, then the first user may authenticate the first user's identity as described above and receive a certificate for the first user's user account on the client device 1004. Subsequently, the first user can login to the first user's user account and perform actions (e.g., presenting representations for credentials) from the first client device. The server 1030 can then monitor use of the client device to access the first user account. A second user may then authenticate the second user's identity and receive a certificate for the second user account on the same client device, which can then be used to login to the second user's user account and perform actions as described above.

In some implementations, the server 1030 may transmit an alphanumeric code to an email address associated with the user account to provide an additional level of authentication. The server 1030 may receive an alphanumeric code from the client device with a request and then determine whether the alphanumeric code received at the server matches the alphanumeric code transmitted from the server to the email address associated with the user before associating a client device with the user account.

While described as being performed at the server, the authentication of the biometric information may be performed partially or completely at the client device. For example, the client device may access biometric identification of the user and compare it with biometric information provided by the user.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more computers which, upon such execution, cause the one or more computers to perform operations comprising:

receiving, at a server, a request from a particular client device to access a user account of a user, wherein the user account provides access to one or more credentials granted to the user, wherein, prior to accessing the user account, the particular client device is not able to generate a graphical representation demonstrating authorization to use the one or more credentials;

determining, at the server and in response to receiving the request, that the particular client device is not included among a set of client devices that are registered with the user account;

in response to determining that the particular client device is not included among the set of client devices that are registered with the user account, transmitting a message to the particular client device, the message prompting the user to provide a biometric identification of the user;

receiving, at the server from the particular client device, data representing the biometric identification of the user;

determining, at the server, that the data received from the particular client device that represents the biometric identification of the user matches a biometric profile of the user associated with the user account; and in response to determining that the data received from the particular client device that represents the biometric identification of the user matches a biometric profile of the user associated with the user account, transmitting a certificate associated with the user account from the server to the particular client device such that the particular client device receiving the certificate is enabled, in response to receiving the certificate, to access the user account and present, at a user interface of the particular client device, a graphical representation demonstrating authorization to use the one or more credentials.

2. The computer-readable medium of claim 1, wherein receiving, at the server, the request from the particular client device to access the user account of the user comprises receiving, at the server, a first request from the particular client device to access the user account of the user; and wherein, after transmitting the certificate associated with the user account from the server to the particular client device, the operations further comprise:

receiving, at the server, a second request from the particular client device to access the user account of the user, the second request including the certificate;

determining, at the server, that the particular client device is associated with the user account based on the certificate; and providing, from the server to the particular client device, access to the user account that provides access to the one or more credentials, without requiring biometric authentication of the user, based on determining that the particular client device is associated with the user account.

3. The computer-readable medium of claim 1, wherein, after transmitting the certificate associated with the user account from the server to the particular client device, the operations further comprise:

receiving, at the server from the particular client device, a request to perform an action associated with the user account, or the associated one or more credentials, the request to perform the action including the certificate;

determining, at the server, that the particular client device is associated with the user account based on the certificate; and in response to determining that the particular client device is associated with the user account based on the certificate:

authorizing, from the server, the particular client device to perform the action; and storing, by the server, an indication that the action was performed by the particular client device, wherein the indication is associated with the user account.

4. The computer-readable medium of claim 1, wherein determining that the particular client device is not included among the set of client devices that are registered with the user account comprises determining that the request received from the particular client device to access the user account of the user does not include the certificate associated with the user account.

5. The computer-readable medium of claim 1, wherein the request received from the particular client device to access the user account of the user comprises a client device identifier of the particular client device; and wherein determining, at the server and in response to receiving the request, that the particular client device is not included among the set of client devices that are registered with the user account comprises determining, at the server and in response to receiving the request, that the client device identifier is not associated with the user account.

6. The computer readable medium of claim 1, wherein transmitting the message to the particular client device, the message prompting the user to provide the biometric identification of the user comprises transmitting a message to the particular client device, the message prompting the user to utter a phrase so as to provide a voice sample of the user;

wherein receiving, at the server from the particular client device, the data representing the biometric identification of the user comprises receiving, at the server from the particular client device, data that represents an utterance of the phrase by the user;

wherein determining, at the server, that the data received from the particular client device that represents the biometric identification of the user matches the biometric profile of the user associated with the user account comprises determining, at the server, that the data received from the particular client device that represents the utterance of the phrase by the user matches a voice print of the user; and wherein, in response to determining that the data received from the particular client device that represents the biometric identification of the user matches a biometric profile of the user associated with the user account, transmitting the certificate associated with the user account from the server to the particular client device comprises, in response to determining that the data received from the particular client device that represents the utterance of the phrase by the user matches the voice print of the user, transmitting the certificate associated with the user account from the server to the particular client device.

7. The computer-readable medium of claim 6, wherein the phrase comprises one or more words randomly selected by the server from one or more dictionaries.

8. The computer-readable medium of claim 6, wherein transmitting the message to the particular client device, the message prompting the user to utter the phrase so as to provide the voice sample of the user comprises transmitting the message to the particular client device for in-app display on the particular client device.

9. The computer-readable medium of claim 6, wherein transmitting the message to the particular client device, the message prompting the user to utter the phrase so as to provide the voice sample of the user comprises transmitting the message via an email to an email address associated with the user account.

10. The computer-readable medium of claim 9, wherein the operations further comprise:

determining, at the server, that the data received from the particular client device that represents the utterance of the phrase by the user comprises an utterance of the phrase transmitted via the email to the email address associated with the user account; and wherein transmitting the certificate associated with the user account from the server to the particular client device in response to determining that the data received from the particular client device that represents the utterance of the phrase by the user matches the voice print of the user comprises transmitting the certificate associated with the user account from the server to the particular client device in response to determining that the data received from the particular client device that represents the utterance of the phrase by the user matches the voice print of the user and in response to determining that the data received from the particular client device that represents the utterance of the phrase by the user comprises an utterance of the phrase transmitted via the email to the email address associated with the user account.

11. The computer-readable medium of claim 1,
wherein transmitting the message to the particular client device, the message prompting the user to provide the biometric identification of the user comprises transmitting a message to the particular client device, the message prompting the user to provide one or more of an iris scan, a fingerprint scan, or a facial scan;
wherein receiving, at the server from the particular client device, the data representing the biometric identification of the user comprises receiving, at the server from the particular client device, one or more of the iris scan, the fingerprint scan, or the facial scan of the user;
wherein determining, at the server, that the data received from the particular client device that represents the biometric identification of the user matches the biometric profile of the user associated with the user account comprises determining, at the server, that the iris scan, the fingerprint scan, or the facial scan of the user matches an iris image, a fingerprint image, or a facial image of the user respectively; and
wherein, in response to determining that the data received from the particular client device that represents the biometric identification of the user matches the biometric profile of the user associated with the user account, transmitting the certificate associated with the user account from the server to the particular client device comprises, in response to determining, at the server, that the iris scan, the fingerprint scan, or the facial scan of the user matches the iris image, the fingerprint image, or the facial image of the user respectively, transmitting the certificate associated with the user account from the server to the particular client device.

12. The computer-readable medium of claim 1, wherein the operations further comprise:
transmitting, from the server to an email address associated with the user account, an alphanumeric code; and
receiving, at the server, the alphanumeric code from the particular client device; and
wherein, in response to determining that the data received from the particular client device that represents the biometric identification of the user matches the biometric profile of the user associated with the user account, transmitting the certificate associated with the user account from the server to the particular client device comprises, in response to determining that the data received from the particular client device that represents the biometric identification of the user matches the biometric profile of the user associated with the user account and determining that the alphanumeric code received at the server from the particular client device matches the alphanumeric code transmitted from the server to the email address associated with the user account, transmitting the certificate associated with the user account from the server to the particular client device.

13. The computer-readable medium of claim 1, wherein:
receiving, at the server, the request from the particular client device to access the user account of the user comprises receiving a request, at the server, that includes a password and a client device identifier of the particular client device; and
determining, at the server, that the particular client device is not associated with the user account comprises determining, at the server, (i) that the password matches an account password associated with the user account, and (ii) that the client device identifier of the particular client device is not associated with the user account.

14. The computer-readable medium of claim 1, wherein the certificate associated with the user account comprises data identifying a signature algorithm.

15. The computer-readable medium of claim 1, wherein the certificate associated with the user account comprises data indicating one or more resources, services, or locations that the user is authorized to access using the user account.

16. The computer-readable medium of claim 1, wherein the operations comprise:
after transmitting the certificate associated with the user account from the server to the particular client device, receiving, from a third-party processing system, data derived by the third-party processing system by optically scanning a graphical representation displayed at a user interface of the particular client device, the graphical representation being a graphical representation demonstrating authorization to use the one or more credentials granted to the user;
validating, at the server, the data received from the third-party processing system that was derived by the third-party processing system by optically scanning the graphical representation displayed at the user interface of the particular client device; and
in response to validating the data received from the third-party processing system that was derived by the third-party processing system by optically scanning the graphical representation displayed at the user interface of the particular client device, transmitting data to the third-party processing system that authorizes the user of the particular client device to use the one or more credentials granted to the user.

17. The computer-readable medium of claim 1, wherein the operations comprise:
transmitting, to a client device that has been previously registered with the user account, a message prompting a user of the previously-registered client device to authorize the particular client device to be included in the set of client devices that are registered with the user account;
receiving, at the server from the previously-registered client device, a response to the message authorizing the particular client device to be included in the set of client devices that are registered with the user account; and
in response to determining that the data received from the particular client device that represents the biometric identification of the user matches the biometric profile of the user associated with the user account, and receiving the response to the message authorizing the particular client device to be included in the set of client devices that are registered with the user account, transmitting the certificate associated with the user account from the server to the particular client device.

18. The computer-readable medium of claim 1, wherein transmitting the certificate such that the particular client device receiving the certificate is enabled to present the graphical representation demonstrating authorization to use the one or more credentials comprises:

transmitting a certificate that enables the particular client device to generate a quick response (QR) code that encodes information used by the server to authorize use of the one or more credentials granted to the user.

19. A computer-implemented method comprising:

receiving, at a server, a request from a particular client device to access a user account of a user, wherein the user account provides access to one or more credentials granted to the user;

determining that the particular client device did not provide a valid certificate corresponding to the user account with the request received at the server;

without receiving a request to register the particular client device with the user account, determining, at the server and in response to receiving the request from the particular client device to access the user account of the user, that the particular client device is not included among a set of client devices that are registered with the user account based on determining that the particular client device did not provide a valid certificate corresponding to the user account with the request received at the server;

in response to determining that the particular client device is not included among the set of client devices that are registered with the user account, transmitting a message to the particular client device, the message prompting the user to provide a biometric identification of the user;

receiving, at the server from the particular client device, data representing the biometric identification of the user;

determining, at the server, that the data received from the particular client device that represents the biometric identification of the user matches a biometric profile of the user associated with the user account; and in response to determining that the data received from the particular client device that represents the biometric identification of the user matches a biometric profile of the user associated with the user account, transmitting a certificate associated with the user account from the server to the particular client device such that the particular client device receiving the certificate is enabled, in response to receiving the certificate, to access the user account that provides access to the one or more credentials.

20. A system comprising:

one or more computers and one or more storage devices storing instructions that are operable, when executed by the one or more computers, to cause the one or more computers to perform operations comprising:

receiving, at a server, a request from a particular client device to access a user account of a user, wherein the user account provides access to one or more credentials granted to the user;

determining that the particular client device did not provide a client device identifier of the particular client device that is registered with the user account with the request received at the server;

determining, at the server and in response to receiving the request, that the particular client device is not included among a set of client devices that are registered with the user account based on determining that the particular client device did not provide a client device identifier of the particular client device that is registered with the user account with the request received at the server;

in response to determining that the particular client device is not included among the set of client devices that are registered with the user account, transmitting a message to the particular client device, the message prompting the user to provide a biometric identification of the user;

receiving, at the server from the particular client device, data representing the biometric identification of the user;

determining, at the server, that the data received from the particular client device that represents the biometric identification of the user matches a biometric profile of the user associated with the user account; and in response to determining that the data received from the particular client device that represents the biometric identification of the user matches a biometric profile of the user associated with the user account, transmitting a certificate associated with the user account from the server to the particular client device such that the particular client device receiving the certificate is enabled, in response to receiving the certificate, to access the user account that provides access to the one or more credentials.

\* \* \* \* \*